United States Patent
Bryant, II

(10) Patent No.: US 6,496,574 B2
(45) Date of Patent: Dec. 17, 2002

(54) APPARATUS AND METHOD FOR REMOTELY RESETTING A COMPUTER

(75) Inventor: James Richard Bryant, II, Escondido, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 38 days.

(21) Appl. No.: 09/800,281

(22) Filed: Mar. 6, 2001

(65) Prior Publication Data

US 2002/0126807 A1 Sep. 12, 2002

(51) Int. Cl.[7] .............................................. H04M 11/00
(52) U.S. Cl. ............................. 379/102.04; 379/102.01
(58) Field of Search ....................... 379/102.01–102.04, 379/90.01, 88.27, 74, 82, 373.01

(56) References Cited

U.S. PATENT DOCUMENTS

| | | | | |
|---|---|---|---|---|
| 4,582,957 A | * | 4/1986 | Hayes et al. ................... | 379/74 |
| 5,379,341 A | * | 1/1995 | Wan ....................... | 379/102.04 |
| 6,385,307 B1 | * | 5/2002 | Brablec et al. .......... | 379/88.22 |

FOREIGN PATENT DOCUMENTS

GB        2116807        *    9/1983

* cited by examiner

Primary Examiner—Wing Chan

(57) ABSTRACT

A reset device resets an electronic device by monitoring a telephone line. The reset device detects a first ring signal transmitted via the telephone line and starts a timer. The ring signals transmitted via the telephone line are counted and compared to a preselected number. When the number of ring signals counted by the reset device is equal to the preselected number, a signal is transmitted to the electronic device causing it to reset.

23 Claims, 4 Drawing Sheets

APPARATUS AND METHOD FOR REMOTELY RESETTING A COMPUTER

TECHNICAL FIELD OF THE INVENTION

The present invention relates to remotely resetting a computer and, more particularly, to resetting a computer via telephone communications.

BACKGROUND OF THE INVENTION

Many electronic devices rely on computers for their operation. A computer associated with an electronic device may operate a plurality of functions associated with the electronic device. The computer may also monitor the operation of the electronic device so as to detect errors in the operation of the electronic device. When an error in the operation of the electronic device is detected, the computer may inform or otherwise alert a technician of the error. In many of these electronic devices, the failure of the computer results in the failure of the electronic device. Furthermore, when the computer has failed, the computer will not be able to inform a technician that the reason for the failure of the electronic device is due to the failure of the computer itself.

Computers require an operating system in order to function properly. The operating systems, however, tend to become unstable and encounter faults at times. These faults cause the computers to fail, which in turn cause the electronic devices to which they are associated with to fail. A fault in the operating system typically requires the computer to be manually reset in order to clear the fault and allow the computer and its associated electronic device to return to normal operation.

Some electronic devices, such as some mass data storage devices, use computers for the additional tasks of communicating with remote users or remote computers. These computers may, as an example, be equipped with telephone modems that allow communications via conventional telephone lines. The communication via a telephone line permits a remote user to access the computer, which permits a user to modify the operation of the electronic device and to monitor errors that may occur in the operation of the electronic device.

The communication with a remote computer further permits the computer associated with an electronic device to contact the remote computer to report errors in the operation of the electronic device. Several computers associated with electronic devices may all communicate errors and the like to a single remote computer. A user of the remote computer may then monitor the status of several electronic devices. For example, a computer associated with an electronic device may be programmed to monitor the electronic device for errors in the operation of the electronic device. Upon the detection of an error, the computer may establish communications with the remote computer via a telephone line. Once the communications are established, the computer associated with the electronic device may transfer information describing the faults detected in the operation of the electronic device to the remote computer. In many situations, faults in the operation of the electronic device may be diagnosed and resolved remotely before a user of the electronic device knows that a problem ever existed.

The use of a computer associated with an electronic device generally works well in operating and diagnosing the electronic device until the computer encounters a fault. For example, when the operating system fails, the computer is rendered dysfunctional. The remote computer is then unable to operate the electronic device. Problems are further exacerbated because the computer associated with the electronic device is not able to establish communications with the remote computer. Therefore, the computer associated with the electronic device is unable to contact the remote computer to report the fault. Accordingly, a user of the remote computer will not be aware of a fault with the electronic device. Even if the user of the remote computer were aware of the fault, he or she would not be able to resolve the problem due to the communications failure. Generally, the only way to resolve a fault in the operating system and restore communications is for a person to manually press a reset function on the computer associated with the electronic device.

Therefore, a need exists for a device or method that overcomes some or all of the above-described problems.

SUMMARY OF THE INVENTION

The invention is directed toward a circuit for remotely resetting a computer. The reset circuit monitors a telephone line for ring signals. When a preselected number of ring signals have been received within a preselected period, the reset circuit transmits a signal to the computer causing the computer to reset.

The reset circuit may comprise a ring detector, a counter, a timer, a comparator, a number generator, and a power controller. The ring detector may comprise a ring detector input and a ring detector output. The ring detector input may be electrically connected to the telephone line. The ring detector output is transitionable to a preselected voltage for a preselected period upon detection of a ring signal at the ring detector input.

The counter may comprise a counter input, a counter output, and a counter enable function. The counter input may be operatively connected to the ring detector output. The counter output may output a binary number corresponding to the number of ring signals detected by the ring detector over a preselected period. The timer may comprise a timer trigger and a timer output. The timer output may be transitionable from a first voltage to a second voltage for a preselected period upon a voltage transition at the timer trigger. The timer output may be operatively connected to the counter enable function.

The comparator may comprise a comparator first input, a comparator second input, and a comparator output. The comparator output may be transitionable between a first comparator voltage when the first comparator input is not equal to the second comparator input and a second comparator voltage when the first comparator input is equal to the second comparator input. The first comparator input may be operatively connected to the counter output and the second comparator input may be operatively connected to the number generator. The number generator generates the aforementioned preselected number of rings that are to be detected by the reset circuit so as to cause it to reset the computer.

The power controller may comprise a controller input and a controller output. The controller input may be operatively connected to the comparator output and the controller output may be operatively connected to a reset function associated with the computer.

When a telephone call is placed to the reset circuit, the ring detector detects the ring signal associated with the telephone call. When the first ring signal is detected, the timer enables the counter to count subsequent rings for a preselected period established by the timer. As the ring signals are detected, they are counted by the counter and compared to the preselected number established by the number generator. When the number of rings detected and the preselected number are equal, the comparator transmits a signal to the power controller instructing it to reset the computer.

DETAILED DESCRIPTION OF THE INVENTION

Figure 1:
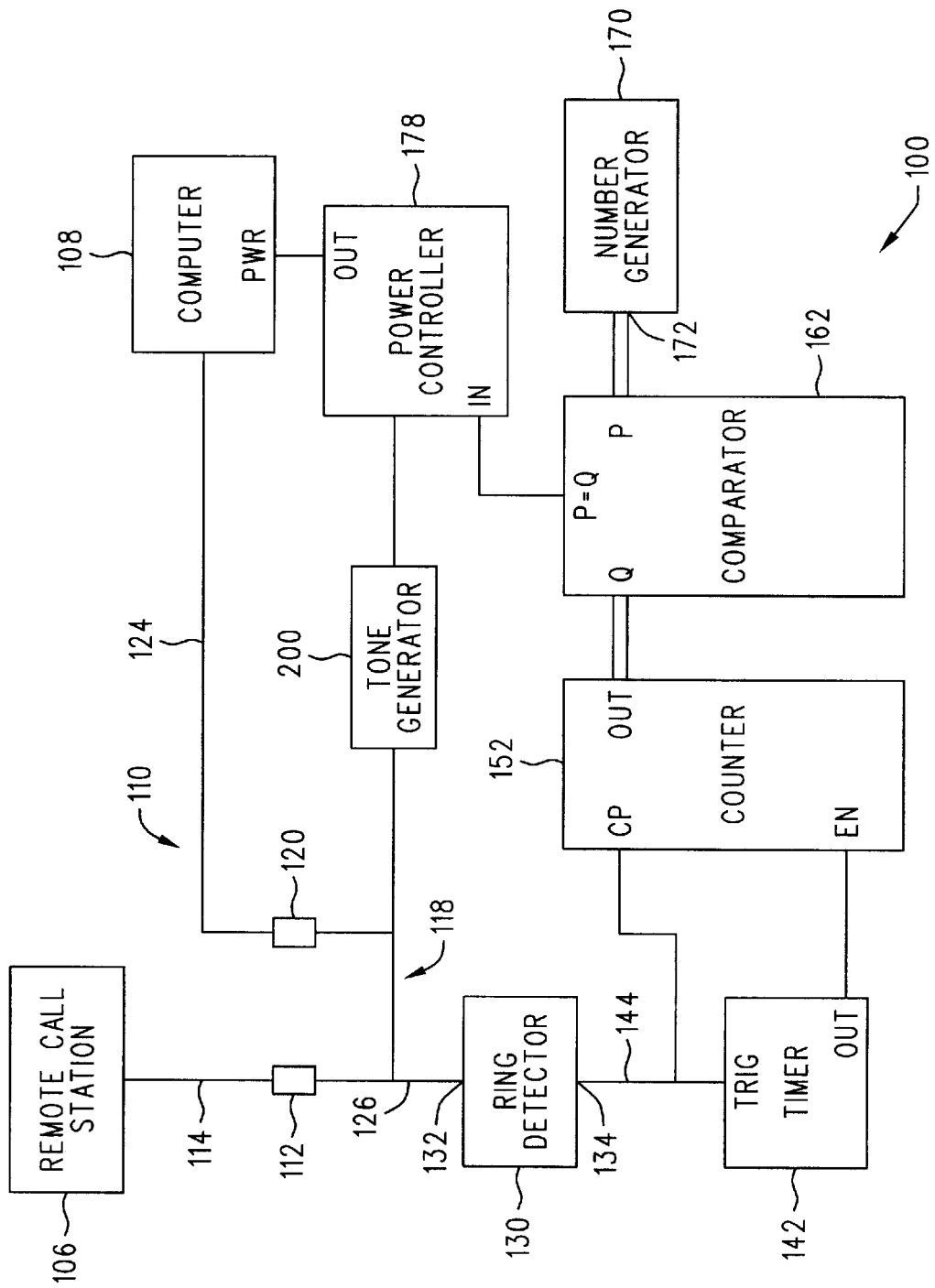
FIG. 1 is a block diagram of a reset circuit.
Figure 2:
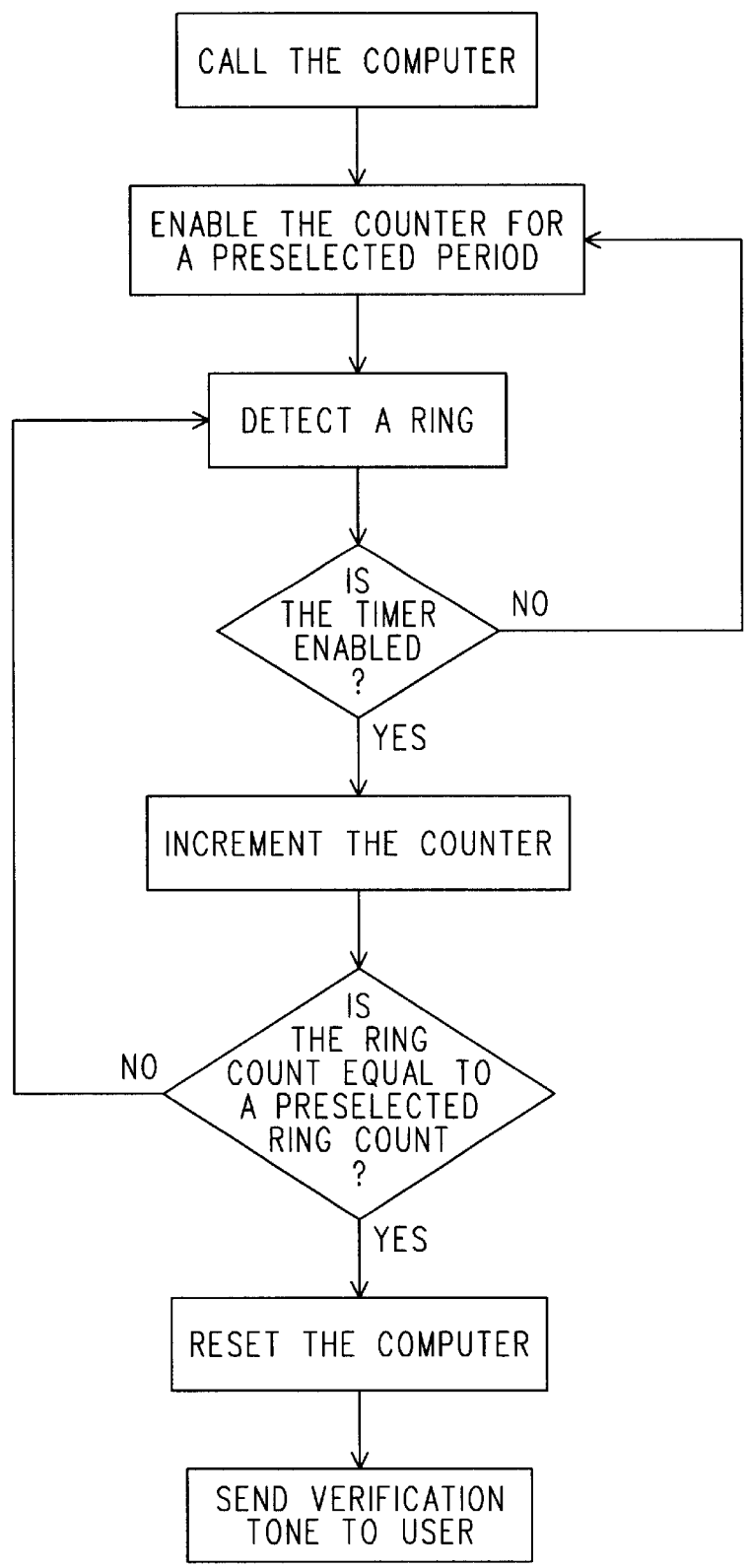
FIG. 2 is a flow chart that described the operation of the reset circuit of FIG. 1.

FIGS. 1 through 3B, in general, illustrate a reset device 100 for resetting an electronic device 108, sometimes referred to as a computer. The reset device 100 may be electrically connected to a telephone line 110. The telephone line 110 may serve to connect a first electronic device 106, sometimes referred to as a remote call station, to the second electronic device 108. The second electronic device 108 has a second device reset function PWR associated therewith.

The reset device 100 may comprise a ring detector 130, a counter 152, a timer 142, a comparator 162, a number generator 170, and a power controller 178. The ring detector 130 may comprise a ring detector input 132 and a ring detector output 134. The ring detector input 132 may be electrically connected to the telephone line 110. The ring detector output 134 may be transitionable to a preselected voltage for a preselected period upon detection of a ring signal at the ring detector input 132.

The counter 152 may comprise a counter input CP, a counter output OUT, and a counter enable function EN. The counter input CP may be operatively connected to the ring detector output 134. The timer 142 may comprise a timer trigger TRIG and a timer output OUT. The timer output OUT may be transitionable from a first voltage to a second voltage for a preselected period upon a voltage transition at the timer trigger TRIG. The timer output OUT may be operatively connected to the counter enable function EN.

The comparator 162 may comprise a comparator first input Q, a comparator second input P, and a comparator output OUT. The comparator output OUT may be at a first comparator voltage when the comparator first input Q is not equal to the comparator second input P. The comparator output OUT may be at a second comparator voltage when the comparator first input Q is equal to the comparator second input P. The comparator first input Q may be operatively connected to the counter output OUT.

The number generator 170 may be operatively connected to the comparator second input P. The power controller 178 may comprise a controller input IN and a controller output OUT. The controller input IN may be operatively connected to the comparator output OUT. The controller output OUT may be operatively connected to the second device reset function PWR.

FIGS. 1 through 3B also, in general, disclose a method for resetting an electronic device 108. The method may comprise transmitting at least one ring signal via a telephone line 110 during a preselected period. The method may further comprise counting the number of ring signals transmitted via the telephone line 110 during the preselected period. The number of ring signals transmitted via the telephone line 110 during the preselected period may be compared to a preselected number. The electronic device 108 may be reset if the number of ring signals transmitted via the telephone line 110 during the preselected period is equal to the preselected number.

Having generally described the reset circuit 100, it will now be described in greater detail.

A block diagram of the reset circuit 100 is shown in FIG. 1. In summary, the reset circuit 100 provides for a remote call station 106 to reset a computer 108 by way of a telephone line 110. If the reset circuit 100 detects a specific number of ring signals transmitted via the telephone line within a preselected period, the reset circuit 100 will reset the computer 108. In the non-limiting example provided herein, the computer 108 is operatively associated with a data backup system, not shown in FIG. 1. Thus, the data backup system may be reset by the reset circuit 100. It should be noted that the reset circuit 100 may be adapted to reset other electronic devices.

The remote call station 106 may, as a non-limiting example, be a computer having a telephone modem, not shown, associated therewith. The remote call station 106 may be connected to a first telephone jack 112 via a telephone line 114. The first telephone jack 112 may be associated with the reset circuit 100, which may be located a great distance from the remote call station. Therefore, the telephone line 114 may comprise switches, relay stations, and other components, not shown, used in long distance telephone communications. The first telephone jack 112 may be electrically connected to a feed-through 118 and to a second telephone jack 120. A telephone line 124 may connect the second telephone jack 120 to the computer 108. The use of the feed-through 118 provides for direct communications between the remote call station 106 and the computer 108 regardless of the operational status of the reset circuit 100.

A line 126, e.g., a telephone line, may electrically connect the feed-through 118 to a ring detector 130. The ring detector 130 may have an input 132 and an output 134, wherein the line 126 is connected to the input 132. The ring detector 130 monitors the telephone line 110 and causes a voltage at its output 134 to transition between a first voltage and a second voltage when a ring signal is transmitted from the remote call station 106.

The output 134 of the ring detector 130 may be electrically connected to a trigger input TRIG of a timer 142 via a line 144. The timer 142 may, as a non-limiting example, be a monostable timer wherein the trigger input TRIG triggers the timer 142. The timer 142 may have an output OUT associated therewith that outputs a voltage transition between a first voltage and a second voltage for a preselected duration upon a voltage transition occurring at the trigger input TRIG. For example, the output OUT of the timer 142 may transition from approximately zero volts to approximately five volts upon a voltage transition occurring at the trigger input TRIG. The output OUT of the timer 142 may be connected to an enable function EN of a counter 152 so that the above-described voltage transition occurring at the output OUT of the timer 142 enables the counter 152 to count.

The output 134 of the ring detector 130 may also be electrically connected to a clock input CP of a counter 152. The counter 152 may have an output OUT that may be a plurality of data lines, such as a data bus, that may represent a binary number. The binary number represented at the output OUT may increment upon voltage transitions occurring at the clock input CP provided that the counter 152 is enabled.

To summarize the operation of the reset circuit 100 up to this point, the ring detector 130 detects a ring signal on the telephone line 110 and causes a voltage transition on the line 144. The voltage transition on the line 144 causes the timer 142 to output a voltage transition on its output OUT to the enable function EN of the counter 152 for a preselected period. The voltage transition at the enable function EN of the counter 152 enables the counter 152 to count. Ring signals detected by the ring detector 130 cause voltage transitions on the line 144, which in turn cause the output OUT of the counter 152 to be incremented. Accordingly, the reset circuit 100 up to this point counts the number of ring signals transmitted on the telephone line 110 over a preselected period. The preselected period is the period of the voltage transition generated at the output OUT of the timer 142.

The output OUT of the counter 152 may be electrically connected to a first input Q of a comparator 162. The comparator 162 may also have a second input P and an output P=Q associated therewith. The second input P may be identical to the first input Q in that it may comprise a plurality of data lines where the voltages on the data lines are representative of a binary number. The output P=Q may, as an example, output a low voltage when the number of the first input Q is equal to the number of the second input P and a high voltage when the number of the first input Q is not equal to the number of the second input P.

A number generator 170 may have an output 172 that is connected to the second input P of the comparator 162. The output 172 may be a plurality of data lines wherein voltages on the data lines represent a binary number. In one non-limiting embodiment of the reset circuit 100, the number generator 170 comprises a plurality of switches, not shown in FIG. 1. Each switch is operatively associated with a power source and one of the above-described data lines of the output 172. The number generated by the number generator 170 is selected by opening or closing the switches, which creates either high or low voltages on the data lines.

The output P=Q of the comparator 162 may be connected to an input IN of a power controller 178. The power controller 178 may have an output OUT that is connected to the reset function PWR of the computer 108. When the output P=Q of the comparator 162 outputs a voltage, e.g., a low voltage, indicative that the first input Q is equal to the second input P, the power controller 178 may output a voltage on the output OUT that causes the computer 108 to reset. In one embodiment, resetting the computer 108 may be accomplished by terminating the power to the reset function PWR for a period.

In one non-limiting embodiment of the reset circuit 100, the power controller 178 has a delay, i.e., twenty seconds, associated therewith. The delay causes a voltage transition to occur at the output for the delay period. Accordingly, the computer 108 is able to operate normally after the delay period. In addition, the delay assures that the reset function of the computer 108 is properly activated. The power controller 178 may also cause a tone generator 200 to transmit a tone on the telephone line 200 during the period of the delay. The tone may have a frequency of about 1.4 kHz and may serve to signal the remote call station 106 that the computer 108 is being reset.

Having described the components of the block diagram of FIG. 1, the operation of the reset circuit 100 will now be described. A more detailed circuit schematic and description of the operation follows. The following description is illustrated by the flow chart of FIG. 2.

In the non-limiting embodiment of the reset circuit 100 of FIG. 1, the computer 108 is connected to the remote call station 106 via the telephone line 110. If the computer 108 or any of its associated components experiences a fault, the fault may be cured by a user at the remote call station 106. For example, if the computer 108 detects a fault with the device to which it is associated, the computer 108 may call the remote call station 106 to report the fault and to seek assistance in curing the fault. The computer 108 may also periodically call the remote call station 106 in order to transmit its operating status to the remote call station 106. In order for this system to function properly, the computer 108 must be able to communicate via the telephone line 110. Therefore, the operating system of the computer 108 must be functional. If the operating system fails, the computer 108 will not be able to communicate via the telephone line 110 and a computer operator will have to physically reset the computer 108 in order to clear faults in the operating system.

The reset circuit 100 provides an alternative to physically resetting the computer 108 when the operating system fails. If a preselected number of ring signals have been transmitted via the telephone line 110 over a preselected period, the reset circuit 100 will reset the computer 108. This allows for the computer 108 to be reset remotely by an operator of the remote call station 106.

When the remote call station 106 sends a ring signal to the computer 108, the ring detector 130 detects the ring signal and outputs a voltage transition on the line 144. The voltage transition may cause the voltage on the line 144 to transition from a normally high state to a low state for a period. The voltage transition generated by the ring detector 130 is output to the trigger input TRIG of the timer 142 and the clock input CP of the counter 152. The voltage transition at the trigger input TRIG of the timer 142 causes the timer 142 to output a voltage transition on the output OUT to the enable function EN of the counter 152. The voltage transition is used to enable the counter 152 to count and may, as examples, be a ground or a positive voltage pulse having a preselected duration, such as five minutes. In one embodiment of the reset circuit 100, the leading edge of the pulse enables the counter 152 and the trailing edge of the pulse disables and clears the counter 152. As described in greater detail below, this configuration permits the first ring signal to enable the counter 152 and to be counted. For example, the leading edge of the voltage transition on the line 144 may trigger the timer 142 to enable the counter 152. The counter 152 may increment on the trailing edge of the voltage transition on the line 144. Accordingly, the first ring signal received by the reset circuit 100 enables the counter 152 and is counted as the first ring signal.

During the period that the counter 152 is enabled, it counts ring signals detected by the ring detector 130. Therefore, as the remote call station 106 continues to call the computer 108, the reset circuit 100 continues to count ring signals. If, by chance, the computer 108 does answer, the remote call station 106 may hang up the telephone line and redial the computer 108 in order to accumulate more ring signals. The ring signals will continue to accumulate so long as they are counted within the period of the voltage pulse generated by the timer 142 because the actions of the computer 108 do not affect the operation of the reset circuit 100.

The number of ring signals counted by the counter 152 is output via the output OUT to the first input Q of the comparator 162. The number of ring signals counted may be a binary number represented by the plurality of data lines extending between the output OUT of the counter 152 and the first input Q of the comparator 162. The second input P of the comparator has a preselected binary number associated therewith that is generated by the number generator 170. For example the number generator 170 may have a plurality of switches, not shown in FIG. 1, that are appropriately toggled to represent the number of ring signals required to be counted by the reset circuit 100 within the period of the voltage pulse generated by the timer 142 to cause the computer 108 to reset.

When the number of ring signals counted by the counter 152 is equal to the number set by the number generator 170, the voltage at the output P=Q of the comparator 162 transitions. This transition cause the power controller 178 to interrupt the power to the computer 108 for a preselected period or to otherwise reset the computer 108. Resetting of the computer 108 causes the operating system of the computer 108 to reboot, which alleviates the above-described fault. At this time, the reset circuit 100 resets itself and monitors the telephone line 110 for subsequent ring signals in order to reset the computer 108 again if required.

It should be noted that in one embodiment of the reset circuit 100, a specific tone is transmitted to the remote call station 106 via the telephone line 110 to indicate that the computer 108 was reset. In another embodiment of the reset circuit 100, power for the reset circuit 100 is received from the power supplying the computer 108 or its associated electronic components. This embodiment alleviates the need for a separate power supply for the reset circuit 100.

Having described the basic operation of the reset circuit 100, a more detailed description of a non-limiting example of the reset circuit 100 will now be described.

Figure 3A:
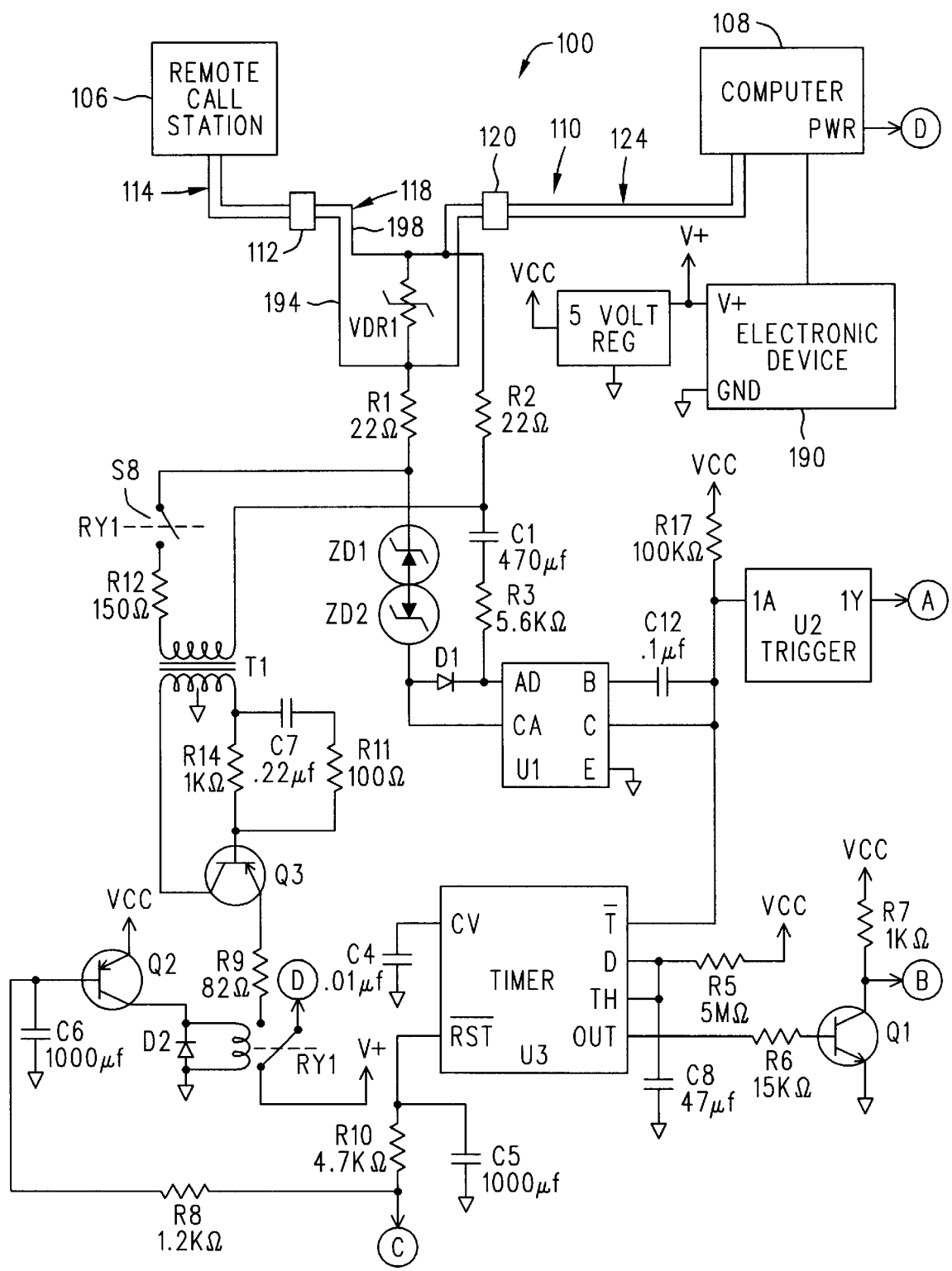
FIGS. 3A and 3B are a non-limiting example of a schematic circuit diagram of the reset circuit of FIG. 1.
Figure 3B:
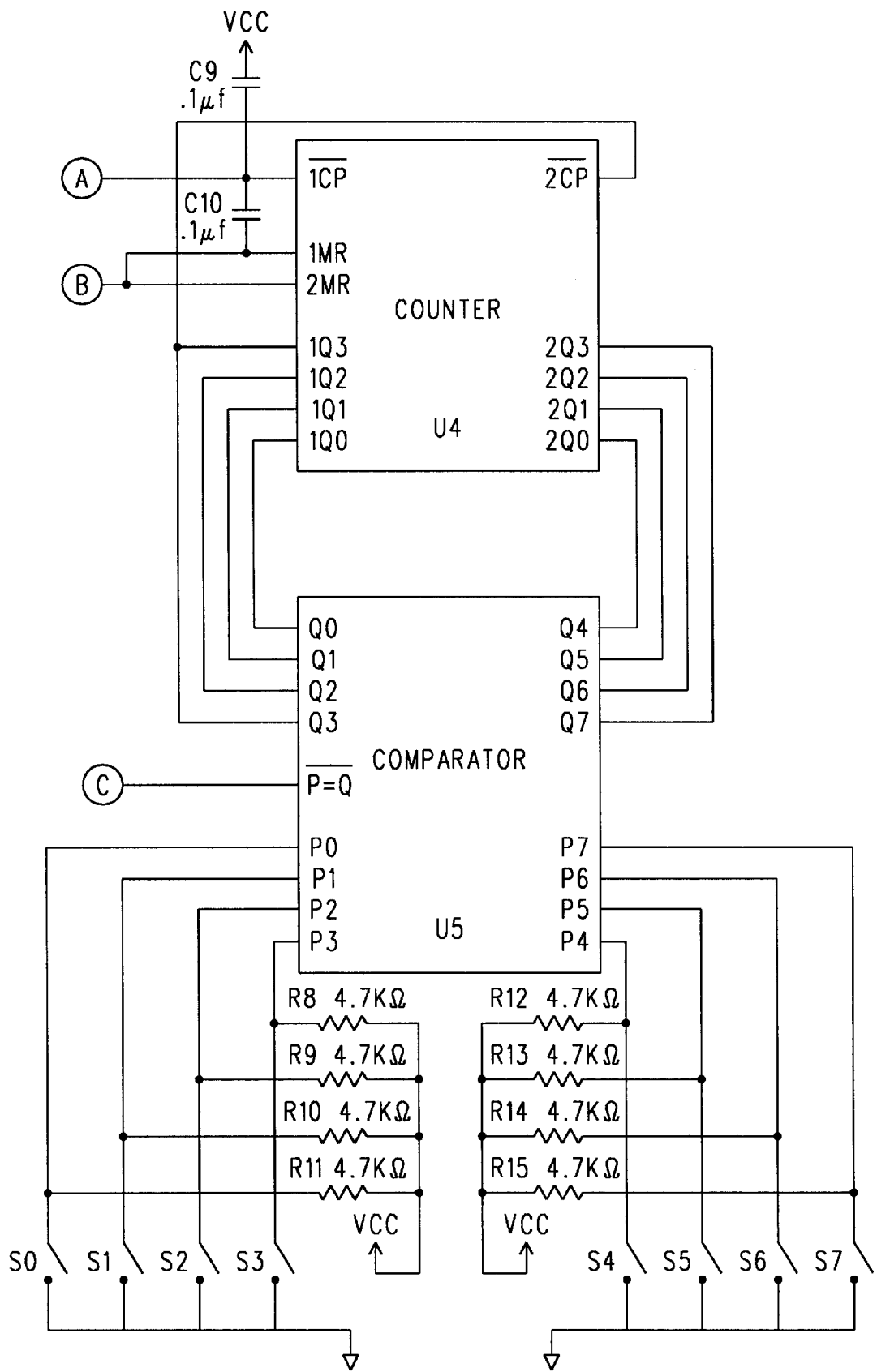

A non-limiting example of a schematic circuit diagram of the reset circuit 100 is illustrated in FIGS. 3A and 3B. The individual components of the reset circuit 100 shown in FIGS. 3A and 3B include more components than were shown in the reset circuit 100 of FIG. 1. FIGS. 3A and 3B show values for the components of the reset circuit 100. It should be noted that these values may be changed in order to alter or customize the performance characteristics of the reset circuit 100.

The computer 108 may be electrically connected to an electronic device 190. The electronic device 190 may, as a non-limiting example, be a mass data storage device that is controlled and monitored by the computer 108. The electronic device 190 may have a direct current voltage output between two terminals, V+ and GND. The output may, as an example, be seventeen volts between V+ and GND. The output of the electronic device 190 may be connected to a voltage regulator VR1 that outputs a voltage VCC. The voltage VCC may be five volts and may be used to supply electric power to the components of the reset circuit 100 in a conventional manner. The voltage regulator VR1 may, as a non-limiting example, be of the type generally referred to as a 7805 or a TO220. In addition to supplying electric power to the voltage regulator VR1, the electronic device 190 may supply electric power directly to the computer 108. It should be noted that other components, not shown, may be used in conjunction with the voltage regulator VR1.

Having described the power supply of the reset circuit 100, the other components of the reset circuit 100 will now be described. The telephone line 110 shown in FIG. 3A may be a dual conductor telephone line used in most telephone lines. The dual conductors are illustrated as being a first conductor 194 and a second conductor 198. A voltage dependent resistor VDR1 may be connected between the first conductor 194 and the second conductor 198 and may serve to suppress voltage spikes and the like that could damage components within the reset circuit 100. The voltage dependent resistor VDR1 may be a two hundred thirty volt device.

A resistor R1 may be connected to the first conductor 194 and a resistor R2 may be connected to the second conductor 198. The resistors R1 and R2 serve to isolate the telephone line 110 from the reset circuit 100. The potential between the resistors R1 and R2 represents signals being transmitted between the remote call station 106 and the computer 108. These signals include ring signals being transmitted from the remote call station 106 to the computer 108.

The ring detector 130, FIG. 1, may be made up of two zener diodes ZD1 and ZD2, a diode D1, a resistor R3, a capacitor C1, and an opticoupler U1. The two zener diodes, ZD1 and ZD1, may be connected in series to the resistor R1. The anodes of the zener diodes ZD1 and ZD2 may be connected together. The cathode of the zener diode ZD2 may be connected to the cathode CA of the opticoupler U1 and the anode of the diode D1. The capacitor C1 may be connected in series with the resistor R2 and the resistor R3. The resistor R3 also connects to the cathode of the diode D1 and the anode AD of the opticoupler U1. The zener diodes ZD1 and ZD2 may be 27 volt zener diodes. The diode D1 may be of the type commonly known as a 1N4148 or a 1N4006 diode. The opticoupler U1 may be of the type commonly known as a 4N35 opticoupler.

The ring detector 130 operates by causing the zener diodes ZD1 and ZD2 to conduct when the voltage between the resistor R1 and the resistor R2 exceeds their zener voltages plus their forward voltages, which is indicative of a ring signal being transmitted on the telephone line 110. In one embodiment of the reset circuit 100, this voltage is equal to a zener voltage of twenty-seven volts plus a forward voltage of 0.7 volts. When the zener diodes ZD1 and ZD2 conduct, a potential is created between the anode AD and cathode CA of the opticoupler U1, which causes a switch, i.e., a transistor, not shown, associated with the output of the opticoupler U1 to conduct. The switch is normally open, causing the output at the collector of the opticoupler U1 to normally be high. When a ring is detected, the switch closes and the voltage at the collector drops to a low voltage. It should be noted that the capacitor C1 and resistor R3 serve as a filter in the detection of ring signals. Without the filtering, the voltage at the collector of the opticoupler U1 would likely oscillate at one of the frequencies associated with the ring signal. It should be noted that in one embodiment, the resistor R3 is rated at one watt and the capacitor C1 is rated at two hundred fifty volts. The resistor R3 and the capacitor C1 may serve to suppress voltage surges on the telephone line 110 so they do not affect the reset circuit 100.

The collector of the opticoupler U1 may be connected to the base of the opticoupler U1 via a capacitor C12. The capacitor C12 serves to attenuate and reduce noise and ripples output by the collector of the opticoupler U1. The collector may also be connected to the voltage VCC via a resistor R17 that may serve as a pull up resistor. The voltage output by the collector of the opticoupler U1 serves to trigger a Schmidt trigger U2 and a timer U3. The Schmidt trigger U2 may be a 74HCT14N inverting Schmidt trigger. It should be noted that other trigger devices may be used in place of the Schmidt trigger disclosed herein. As will be described in greater detail below, the output 1Y of the Schmidt trigger U2 may be connected to a counter input 1CP of a counter U4. In one embodiment, the capacitor C12 is located in close proximity to the opticoupler U1 in order to prevent the Schmidt trigger U2 from erroneously triggering due to noise. In another embodiment of the reset circuit 100, the opticoupler U1, the Schmidt trigger U2, and the counter U4 are located in close proximity to each other to prevent noise from affecting the counting of ring signals.

As briefly described above, the collector of the opticoupler U1 may be connected to the trigger input TRIG of the timer U3. The timer U3 described herein is a conventional 555 timer. It should be noted that other timer circuits may be used by the reset circuit 100. As will be described in greater detail below, the timer U3 serves to enable the counter U4 for a preselected period. If the counter U4 counts a preselected number of ring signals in the preselected period, the reset circuit 100 will reset the computer 108. In one embodiment of the reset circuit 100, components associated with the timer U3 also provide a period in which a tone is transmitted to the remote call station 106 indicating that the computer 108 is being reset.

The timer U3 is in monostable mode. Accordingly, the discharge, referenced as D, and the threshold, referenced as TH, are connected together and are connected to the voltage VCC via a resistor R5 and to ground via a capacitor C8. The values of the resistor R5 and the capacitor C8 determine the period in which the output, referenced as OUT, of the timer U3 outputs a high voltage. This period is the period in which the reset circuit 100 counts the number of ring signals transmitted on the telephone line 110 to determine if the computer 108 should be reset. In the non-limiting example provided herein, the value of the capacitor C8 is forty-seven microfarads and the value of the resistor R5 is five megohms, which provides for a period of approximately seven minutes. Accordingly, the remote call station 106 has seven minutes to transmit the preselected number of ring signals to the computer 108 so as to cause the computer reset circuit 100 to reset the computer 108. The values of C8 and R5 may be varied in order to vary this period.

With regard to the other components associated with the timer U3, the control voltage, referenced as CV, is connected to ground via a capacitor C4. As will be described in greater detail below, the reset, referenced as RST, is connected to a comparator U5, FIG. 3B. As described in greater detail below, the comparator U5 compares the number of rings received by the reset circuit 100 to a predetermined number. When they are equal, the comparator U5, among other functions, resets the timer U3 via the reset RST.

The output OUT of the timer U3 is connected to the base of a transistor Q1 via a resistor R6. The transistor Q1 may, as a non-limiting example, be a 2N222 transistor and may serve to invert the output voltage of the timer U3. The emitter of the transistor Q1 is connected directly to ground. The collector of the transistor Q1 is connected to the voltage VCC via a resistor R7. The collector of the transistor Q1 is also connected to resets on the counter U4, referenced as 1MR and 2MR. The output OUT of the timer U3 is normally low, but is inverted by the transistor Q1. The inversion causes a high voltage to be normally present at the resets 1MR and 2MR, which disables the counter U4. When the timer U3 is triggered, the voltages at the resets 1MR and 2MR transition to low voltages and the counter U4 is enabled to count.

The counter U4 may, as a non-limiting example, be a 74HCT393E dual 4-stage binary counter. As described above, the reset inputs, 1MR and 2MR, of the counter U4 are connected to the collector of the transistor Q1. An input, 1CP, of the counter U4 is connected to the output 1Y of the Schmidt trigger U2. It should be noted that the inputs 1CP and 2CP of the counter U4 are inverting and the resets 1MR and 2MR are non-inverting. Accordingly, when a ring signal is received by the reset circuit 100, the counter U4 is enabled at the leading edge of the ring signal and starts counting at the trailing edge of the ring signal. Thus, the first ring signal enables the counter U4 and is able to be counted by the counter U4.

The counter U4 is configured to operate as an eight bit counter. The outputs 1Q0 through 1Q3 are the lower four bits and count to eight. The bit 1Q3 is connected to the clock input 2CP which increments the high bits 2Q0 through 2Q3 of the counter U4. Accordingly, the counter U4 is configured as an eight bit binary counter. The outputs of the counter U4 are connected to first inputs Q0 through Q7 of the comparator U5. Second inputs P0 through P7 of the comparator U5 are connected via switches S0 through S7 to ground. The second inputs P0 through P7 are also connected to the voltage VCC through pull up resistors R8 through R15. When a switch S0 through S7 is open, its corresponding input is high and when a switch S0 through S7 is closed, its corresponding input is low. This configuration allows the switches S0 through S7 to be opened or closed so as to represent an eight bit binary number at the second inputs P0 through P7 of the comparator U5. The comparator U5 has an output P=Q that is normally high, but transitions low when the first inputs Q0 through Q7 are equal to the second inputs P0 through P7. When the number of ring signals received by the reset circuit 100 is equal to the binary number set by the switches S0 through S7, the output P=Q is low. The output P=Q is connected to the reset RST of the timer U3 which causes the timer U3 to reset when the correct number of ring signals have been detected. The output P=Q is also connected to ground via a resistor R10 and a capacitor C5 which may, as a non-limiting example, have a value of approximately one thousand microfarads. The capacitor C5 and the resistor R10 delay the voltage transition at the reset RST input of the timer U3, which delays the resetting of the timer U3. In the non-limiting example described herein, the resetting of the timer U3 is delayed by approximately twenty seconds. During this delay period, the output OUT of the timer U3 does not change. Therefore, the counter U4 is not reset and the output P=Q remains low during this delay period. As described below, this delay period is used to reset the computer 108 and to transmit a tone onto the telephone line 110 indicating that the computer 108 is being reset.

The output P=Q is also connected to the base of a transistor Q2 via a resistor R8. The emitter of the transistor Q2 is connected to the voltage VCC and the collector is connected to a diode D2 and a relay RY1, which are both connected to ground. The diode D2 serves to suppress voltage spikes when the relay RY1 transitions. The base of the transistor Q2 is also connected to ground via a capacitor C6, which serves to delay the time required for the transistor Q2 to switch. When the voltage at the P=Q output of the comparator U5 transitions low, the transistor Q2 conducts and energizes the relay RY1. The transistor Q2 may, as an example, be a PN4250 transistor. It should be noted that in one embodiment of the reset circuit 100, the capacitor C6 is not present.

The relay RY1 normally connects the PWR input of the computer 108 to the voltage V+. When the relay RY2 is energized, its internal switch toggles which causes the supply of power to the computer 108 via the PWR input to be terminated. When the relay RY1 is denergized, power to the computer 108 via the PWR input is restored, which causes the computer 108 to reset. The operating system of the computer 108 is then reset or rebooted accordingly. It should be noted that the computer 108 may be reset by other means, such as causing a voltage transition to be present at another input of the computer 108.

The toggling of the switch within the relay RY1 causes the tone generator 200 to be activated by diverting the voltage V+ from the computer 108 to the tone generator 200. In a non-limiting embodiment, the tone generator 200 has a resistor R9 connected between the relay RY1 and the emitter of a transistor Q3. The primary side of an audio isolation transformer T1 is connected between the collector and base of the transistor Q3. In addition, a resistor R14 is located between the audio isolation transformer T1 and the base of the transistor Q3. The center lead of the audio isolation transformer T1 is connected to ground. A capacitor C7 and a resistor R11 are connected in series and their series combination is connected in parallel with the resistor R14. The combination of the resistor R14, the resistor R11, and the capacitor C7 create a resonating circuit that generates an audible tone at the primary side of the audio isolation transformer T1. As described in detail below, this tone is transmitted on the telephone line 110 to indicate that the computer 108 is being reset. The transistor Q3 may, as an example, be a 2N3906.

The secondary side of the audio isolation transformer T1 is connected to the resistor R1 and the resistor R2 via a resistor R12 and a second switch S8 associated with the relay RY1. The switch S8 is normally open. When the relay RY1 is energized, the switch S8 closes, causing the secondary side of the audio isolation transformer T1 to be operatively connected to the telephone line 110. Accordingly, the tone generated by the tone generator 200 is transmitted onto the telephone line 110. The tone generated by the embodiment of the reset circuit described herein is approximately 1.4 kHz. It should be noted that when the capacitors C5 and C6 charge, the transistor Q2 turns off which denergizes the relay RY1. The tone generator 200 is then deactivated and the audio isolation transformer T1 is disconnected from the telephone line 110.

Having described the components of the schematic illustrated in FIGS. 3A and 3B, the operation of the reset circuit 100 illustrated in FIGS. 3A and 3B will now be described in greater detail.

The reset circuit 100 normally provides for power to be supplied to the PWR input of the computer 108. This is accomplished because the relay RY1 is configured so that when it is denergized, the voltage V+ is connected to the computer 108. It should be noted that this configuration of the relay RY1 will provide for the computer 108 to receive power even if a fault occurs in the reset circuit 100. For example, should the relay RY1 not be able to be energized, power will still be provided to the computer 108.

When a ring signal is transmitted on the telephone line 110, it creates an AC signal that is greater than the zener voltages plus the forward voltages of the zener diodes ZD1 and ZD2. When the zener and forward voltages are exceeded, current passes through the opticoupler U1 and is filtered by the capacitor C1. Accordingly, each ring signal is converted to a single pulse. The pulse causes the switch within the opticoupler U1 to conduct, which causes the collector of the opticoupler U1 to transition low. It should be noted that the opticoupler U1 serves to isolate the telephone line 110 from the remaining components within the reset circuit 100.

The collector of the opticoupler U1 and thus the input 1A of the Schmidt trigger U2 are normally high. The Schmidt trigger U2 serves as an inverter causing the output 1Y of the Schmidt trigger U2 to be normally low. When a ring signal is detected, the voltage at the input 1A of the Schmidt trigger U2 transitions high and the voltage at the output 1B transitions low. As will be described in greater detail below, this transitioning provides for counting of the ring signal.

When the collector of the opticoupler U1 transitions low, the trigger input TRIG of the timer U3 also transitions low. This transition at the trigger input TRIG causes the output OUT of the timer U3 to transition for a preselected period. In the embodiment where the timer U3 is a 555 timer, the output OUT transitions from a normally low voltage to a high voltage for the preselected period. When the output OUT of the timer U3 is high, the transistor Q1 conducts, which causes the voltage at the collector to drop to a low voltage. This low voltage causes the resets 1MR and 2MR on the counter U4 to transition low, which enables the counter U4 to count. The components associated with the timer U3 determine the period that the output OUT remains high, which is the period that the reset circuit 100 counts ring signals transmitted via the telephone line 110.

At the trailing edge of the ring signal, the input 1CP of the counter U4 transitions from high state to a low state, which causes the binary number represented by the outputs 1Q0 through 1Q3 to increment. The outputs 1Q0 through 1Q3 are the lower four bits of an eight bit binary number. When the output 1Q3 transitions from a high state to a low state, it causes the binary number represented by the outputs 2Q0 through 2Q3 to increment. The combination of the outputs 1Q0 through 1Q3 and 2Q0 through 2Q3 represent an eight bit binary number of the number of ring signals detected by the reset circuit 100. It should be noted that this configuration of the reset circuit 100 uses the first ring signal to trigger the timer U3 and counts the first ring signal. Other embodiments of the reset circuit may be timed so as not to count the first ring signal.

The outputs 1Q0 through 1Q3 and 2Q0 through 2Q3 of the counter U4 are connected to the first inputs Q0 through Q7 of the comparator U5. The second inputs P0 through P7 of the comparator U5 are connected to switches S0 through S7. The switches S0 through S7 are toggled to represent a binary number that is the number of ring signals the reset circuit 100 is required to detect in order to reset the computer 108. When the inputs Q0 through Q7 are equal to the inputs P0 through P7 the output P=Q transitions from a high voltage to a low voltage.

The output P=Q is connected to the reset RST of the timer U3 and the base of the transistor Q2. The output P=Q is also connected to the capacitors C5 and C6 via resistors R8 and R10, which delay the effect of the transition of the output P=Q. The timer U3 will reset and eventually cause the output P=Q of the comparator U5 to transition back to its normal high state. However, during the period that a low voltage is present at the base of the transistor Q2, it will conduct. When transistor Q2 conducts, it energizes the relay RY1, which interrupts power to the computer 108 and, thus, resets the computer 108 when power is returned to the computer 108. In addition, while the relay RY1 is energized, the tone generator 200 transmits a tone via the telephone line 110 as was described above. When the timer U3 resets, the reset circuit 100 is ready to monitor the telephone line 110 for another first ring to begin counting ring signals. Thus, the computer 108 is able to be reset solely by placing a specific number of calls to the reset circuit 100 within a preselected period.

Having described an embodiment of the reset circuit 100, other embodiments will now be described.

In one embodiment, the Schmidt trigger U2 is not required. The Schmidt trigger U2 reduces noise and the like between the opticoupler U1 and the counter U4. Other inverters or triggers may be used in place of the Schmidt trigger U2. In another embodiment, the timing of the reset circuit 100 may be changed to alleviate the need for an inverter. In yet another embodiment, several Schmidt triggers or inverters are used to assure that each ring signal represents a single voltage transition that is counted by the counter U4. Accordingly, a single ring signal will not be counted several times.

In another embodiment of the reset circuit 100, illumination devices may be included to provide signals as to the status of the reset circuit 100. For example, a LED may be associated with the power supply to indicate whether the reset circuit is receiving power. Another LED may be operatively associated with the ring detector so as to illuminate when the ring detector detects a ring signal.

In another embodiment, several reset circuits may be operatively connected to the remote call station 106 by way of telephone lines. Accordingly, the remote call station 106 may monitor several electronic devices and reset their corresponding computers by calling their unique telephone numbers as described above.

The reset circuit 100 has been described herein as operating in conjunction with a telephone line 110. It should be noted that the reset circuit 100 may operate with other telephone communications and transmissions. For example, the reset circuit may count ring signals transmitted via wireless transmissions, such as by cellular telephones. Accordingly, the term telephone line as used herein refers to a wide variety of communication mediums.

It should be noted that the circuit provided herein is a non-limiting example of the reset circuit.

Variations within the circuit may be made to customize the reset circuit. For example, different components may be used and different timing schemes may be used. In one embodiment of the reset circuit, the circuit is fabricated onto a single programmable integrated circuit.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A reset device comprising:
    a ring detector comprising a ring detector input and a ring detector output, said ring detector input being electrically connectable to a telephone line, said ring detector output being transitionable to a preselected voltage for a preselected period upon detection of a ring signal at said ring detector input, said telephone line connecting a first electronic device to a second electronic device, said second electronic device having a second device reset function associated therewith;
    a counter comprising a counter input, a counter output, and a counter enable function, said counter input being operatively connected to said ring detector output;
    a timer comprising a timer trigger and a timer output, said timer output being transitionable from a first voltage to a second voltage for a preselected period upon a voltage transition at said timer trigger, said timer output being operatively connected to said counter enable function;
    a comparator comprising a comparator first input, a comparator second input, and a comparator output, said comparator output being at a first comparator voltage when said comparator first input is not equal to said comparator second input, said comparator output being at a second comparator voltage when said comparator first input is equal to said comparator second input, said comparator first input being operatively connected to said counter output;
    a number generator operatively connected to said comparator second input; and
    a power controller comprising a controller input and a controller output, said controller input being operatively connected to said comparator output, said controller output being operatively connected to said second device reset function.

2. The device of claim 1 and further comprising a tone generator comprising a tone generator input and a tone generator output, said tone generator input being operatively connected to said controller output and said tone generator output being operatively connected to said telephone line.

3. The device of claim 2 wherein said tone generator output has an active mode and an inactive mode, and further comprising a second timer operatively associated with said tone generator, said second timer controlling the time in which said tone generator output is in said active mode.

4. The device of claim 1, wherein said number generator comprises at least one switch having an open position and a closed position.

5. The device of claim 4, wherein said at least one switch has a first connector and a second connector, said first connector being operatively associated with said comparator second input and said second connector being operatively connected to a preselected voltage potential.

6. The device of claim 1, wherein said second electronic device comprises a computer.

7. A method for resetting an electronic device connected to a telephone line, said method comprising:
    transmitting at least one ring signal to said electronic device via said telephone line during a preselected period;
    counting the number of ring signals transmitted via said telephone line during said preselected period;
    comparing said number of ring signals transmitted via said telephone line during said preselected period to a preselected number;
    resetting said electronic device if said number of ring signals transmitted via said telephone line during said preselected period is equal to said preselected number; and
    transmitting a tone via said telephone line upon said resetting said electronic device.

8. The method of claim 7, wherein said resetting comprises activating a reset function associated with said electronic device.

9. The method of claim 7, wherein said resetting comprises interrupting power to said electronic device.

10. A device for resetting a first electronic device connected to a telephone line, said device comprising:
    detection means for detecting ring signals transmitted from a second electronic device to said first electronic device via said telephone line;
    counting means for counting ring signals detected by said detection means;
    timing means for enabling said counting means for a preselected period upon the detection of a first ring signal;

comparing means for comparing the number of ring signals counted by said counting means within said preselected period to a preselected number; and reset means for resetting said first electronic device upon the number of ring signals counted by said counting means within said preselected period equaling said preselected number.

11. The device of claim 10 and further comprising a tone generating means for transmitting a tone via said telephone line when said first electronic device is reset.

12. The device of claim 10 wherein said reset means comprises a means for interrupting the supply of power to said first electronic means.

13. A method of resetting a first electronic device, said method comprising:

monitoring a telephone line for at least one ring signal, wherein said telephone line is connected between said first electronic device and a second electronic device;

transmitting at least one ring signal from said second electronic device to said first electronic device via said telephone line;

activating a timer for a preselected period upon detection of a first ring signal;

incrementing a counter upon detection of each of said at least one ring signals during said preselected period that said timer is activated;

comparing the counter to a preselected number; and resetting said first electronic device if said counter equals said preselected number.

14. The method of claim 13, wherein said resetting comprises interrupting power to said first electronic device.

15. The method of claim 13, wherein said resetting comprises activating a reset function associated with said first electronic device.

16. The method of claim 13, wherein said incrementing comprises incrementing a counter upon detection of each of said at least one ring signals during said preselected period that said timer is activated and subsequent to detection of said first ring signal.

17. The method of claim 13 and further comprising generating a tone and transmitting said tone via said telephone line upon resetting of said first electronic device.

18. The method of claim 13, wherein said activating comprises activating a timer for a preselected period upon detection of a leading edge of said first ring signal, and wherein said incrementing comprises incrementing a counter upon detection of trailing edges of successive ones of said at least one ring signal during said preselected period that said timer is activated.

19. A method for resetting an electronic device, said method comprising:

transmitting at least one telephone ring signal to said electronic device via a telephone line, wherein said electronic device will respond to said at least ring signal if said electronic device is functioning properly;

monitoring said telephone line to determine if said electronic device has responded to said at least one ring signal; and resetting said electronic device if said electronic device has not responded to said at least one ring signal.

20. The method of claim 19, wherein said resetting comprises activating a reset function associated with said first electronic device.

21. The method of claim 19, and further comprising transmitting a tone on said telephone line when said electronic device has been reset.

22. The method of claim 19, wherein said monitoring comprises counting the number of telephone ring signals that have been transmitted to said electronic device and comparing said number to a preselected number, and wherein said resetting comprises resetting said electronic device if said number of ring signals equal said preselected number.

23. The method of claim 19, wherein said resetting comprises interrupting power to said first electronic device.

* * * * *